United States Patent
Sugino (10) Patent No.: US 10,147,514 B2
(45) Date of Patent: Dec. 4, 2018

(54) WIRE HARNESS

(71) Applicant: Sumitomo Wiring Systems, Ltd., Yokkaichi, Mie (JP)

(72) Inventor: Hidetoshi Sugino, Mie (JP)

(73) Assignee: Sumitomo Wiring Systems, Ltd., Yokkaichi, Mie (JP)

( * ) Notice: Subject to any disclaimer, the term of this patent is extended or adjusted under 35 U.S.C. 154(b) by 0 days.

(21) Appl. No.: 15/824,346

(22) Filed: Nov. 28, 2017

(65) Prior Publication Data

US 2018/0174704 A1    Jun. 21, 2018

(30) Foreign Application Priority Data

Dec. 16, 2016    (JP) .................................. 2016-244424

(51) Int. Cl.
*H01B 7/00* (2006.01)
*H02G 3/04* (2006.01)
*B60R 16/02* (2006.01)

(52) U.S. Cl.
CPC ....... *H01B 7/0045* (2013.01); *B60R 16/0215* (2013.01); *H02G 3/0462* (2013.01)

(58) Field of Classification Search
CPC . H01B 7/0045; B60R 16/0215; H02G 3/0462
USPC ........................................................ 174/72 A
See application file for complete search history.

(56) References Cited

U.S. PATENT DOCUMENTS

| 2015/0266435 A1* | 9/2015 | Wakabayashi ...... B60R 16/0215 |
| | | 174/72 A |
| 2015/0279514 A1* | 10/2015 | Sato .................... B60R 16/0207 |
| | | 174/72 A |

FOREIGN PATENT DOCUMENTS

JP    2015146673 A    8/2015

* cited by examiner

*Primary Examiner* — Timothy Thompson
*Assistant Examiner* — Charles Pizzuto
(74) *Attorney, Agent, or Firm* — Reising Ethington, P.C.

(57) ABSTRACT

A wire harness WH is provided with a pipe, through which wires are passed. The pipe has multiple split portions split in the longitudinal direction. The wires are branched in the longitudinal direction. The locations of branching of the wires are defined by locations corresponding to the split portions.

5 Claims, 6 Drawing Sheets

WIRE HARNESS

CROSS REFERENCE TO RELATED APPLICATIONS

This application claims the priority of Japanese patent application JP2016-244424 filed on Dec. 16, 2016, the entire contents of which are incorporated herein.

TECHNICAL FIELD

The present invention relates to a wire harness.

BACKGROUND ART

The wire harness disclosed in JP 2015-146673A is provided with several wires and a protector holding the wires. The protector is provided with a main body portion molded from synthetic resin as a single unit. The main body portion includes a bottom plate portion and a pair of side wall portions rising from two ends of the bottom plate portion. A space where wires can be held is formed between the bottom plate portion and the pair of side wall portions. An opening provided in the main body portion, which is located between the distal end portions of the pair of side wall portions, is closed by a cover portion similarly molded from synthetic resin as a single unit. A cover lock portion provided in the cover portion engages a cover lock receiving portion provided in the main body portion, as a result of which the cover portion maintains the opening of the main body portion in a closed state.

JP 2015-146673A is an example of related art.

SUMMARY

Incidentally, when wire harnesses are used in vehicles, protectors have to be fabricated for each vehicle separately because the routing pathways of each vehicle are different. For this reason, numerous molds are required for molding, which presents a problem in terms of increased tooling costs.

The present design was made by considering the above-described circumstances and it is an object of the design to provide a wire harness of superior versatility that can be adapted to various routing pathways.

The present design may include a tubular pipe, through which wires are passed, the pipe being split into multiple portions in the longitudinal direction and having split portions that can define the locations of branching of the above-mentioned wires.

A wire harness of superior versatility that can be adapted to various routing pathways can be provided because the locations of branching of the wires can be defined by the split portions.

EMBODIMENTS

Preferred embodiments of the present design are illustrated below.

A base portion extending in the longitudinal direction is provided in one of the sections obtained by circumferentially bisecting the pipe, and the multiple split portions are provided in the other section. As a result of coupling the multiple split portions to the base portion in the circumferential direction, the pipe assumes a tubular configuration. This provides for excellent routing operation characteristics because the split portions and the base portion can be coupled in a state, in which the wires are routed along the base portion. In addition, the position of each split portion in the longitudinal direction can be determined with reference to the base portion.

The multiple split portions may be made up of multiple portions of different length. This allows a variety of routing patterns to be formed by combining multiple types of split portions of different length.

The multiple split portions are made up of multiple long split portions of longer length in the longitudinal direction and at least one short split portion of shorter length in the longitudinal direction. The above-mentioned at least one short split portion may be disposed between two of the above-mentioned multiple long split portions arranged side-by-side in the longitudinal direction. This makes it possible to use locations corresponding to the short split portions as branching locations in the routing pathway.

The above-mentioned at least one short split portion has an extraction outlet that allows the wires to be pulled out. This makes it possible to easily form branch circuits by pulling out wires from the extraction outlet of the short split portions.

The pipe may be configured to permit bending in locations corresponding to the multiple long split portions. As a result, the pipe can be bent in accordance with various routing patterns and its versatility can be further enhanced.

<Embodiment 1>

Embodiment 1 is discussed below with reference to drawings.

The wire harness WH of this Embodiment 1 is routed so as to interconnect equipment mounted on a vehicle, not shown, and is made up of multiple wires 10 and an elongated tubular pipe 20, through which the wires 10 are passed.

Figure 1:
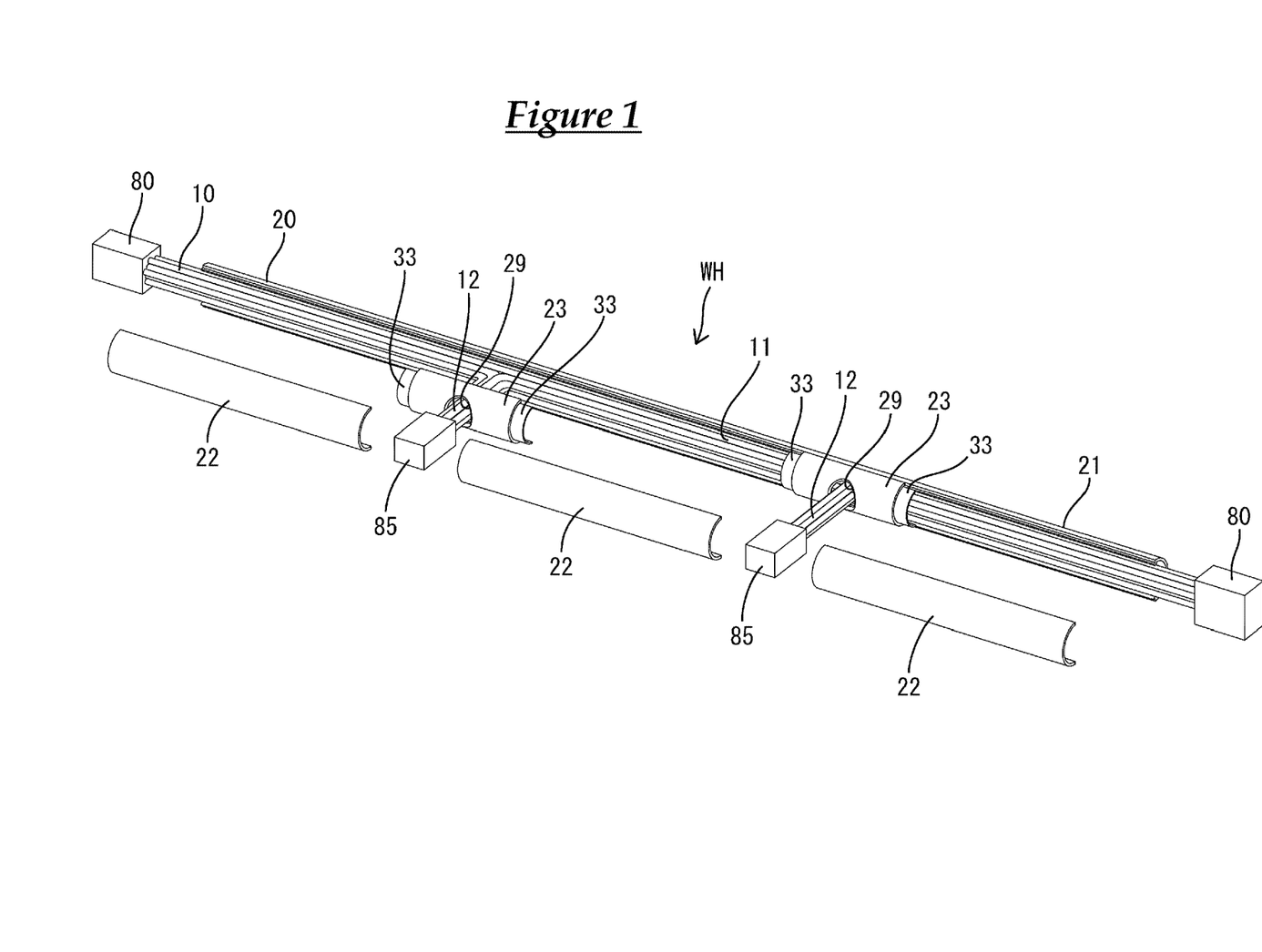
FIG. 1 is an oblique view illustrating a state prior to attachment of long split portions to a base portion in the wire harness used in Embodiment 1.

It is assumed that the wires 10 are low-voltage wires that carry a relatively small current and include multiple core wires and insulating jackets covering the periphery of each core wire. The longitudinal end portions (two end portions) of each wire 10 are connected to connectors 80. It is assumed that the connectors 80 can be mated with counterpart connectors, not shown, on the device side. As shown in FIG. 1, multiple sites in the longitudinal direction of the wires 10 serve as branching sites where branches 12 branch from a trunk 11. The end portions of the branches 12 are connected to branch connectors 85.

The pipe 20 extends in a thin cylindrical shape and possesses sufficient rigidity to protect the wires 10 (trunk 11) that pass therethrough. This pipe 20 is made up of a single base portion 21 long enough to extend across the entire length thereof, and multiple split portions 22, 23 split in the longitudinal direction.

Figure 4:
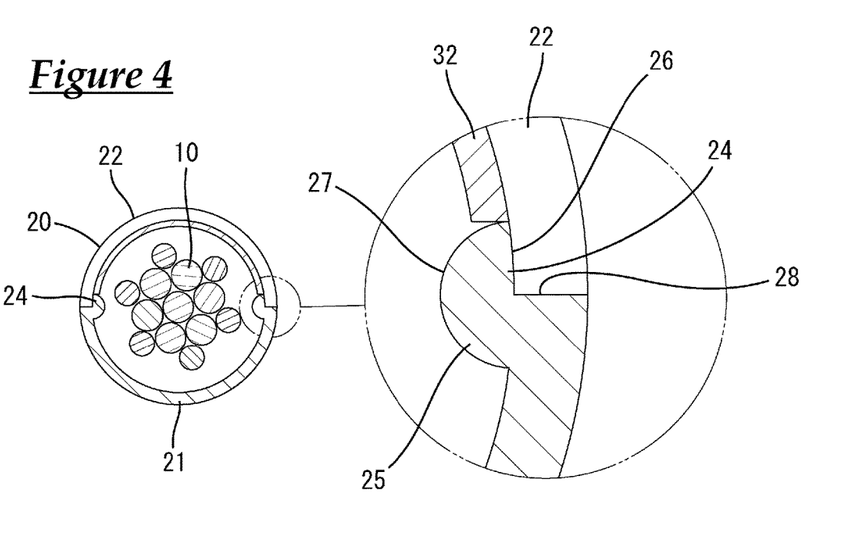
FIG. 4 is a cross-sectional view taken along line A-A in FIG. 3.
Figure 5:
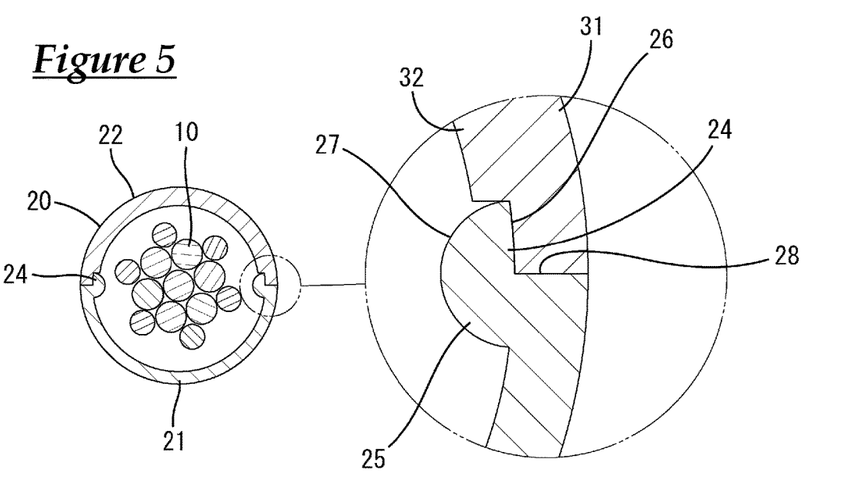
FIG. 5 is a cross-sectional view taken along line B-B in FIG. 3.

The base portion 21, which is made of aluminum, aluminum alloy, or another metal and forms the lower half of the pipe 20, i.e. one of the sections produced by circumferentially bisecting the pipe 20, has a U-shaped cross-section and, more specifically, is formed like a gutter with a semicircular cross-sectional shape. The circumferential end portions (two end portions) of the base portion 21 have formed therein mating receiving portions 24 extending to the same height throughout the entire length thereof. As shown in FIG. 4 and FIG. 5, the mating receiving portions 24 have projection portions 25 protruding into the pipe 20. The projection portions 25, which have a standing surface 26 that stands in the vertical direction on the inner side in the thickness direction of the circumferential end portion of the base portion 21, and a hemispherical surface 27 curved into the pipe 20, have a semicircular cross-sectional shape. The mating receiving portions 24 have formed therein a recess 28 with a substantially L-shaped cross-section between an end face section extending in a radial direction in the circumferential end portion of the base portion 21 and the standing surface 26 of the projection portion 25.

The split portions 22, 23 are arranged side-by-side in a chain-like configuration in the longitudinal direction and form the upper half of the pipe 20, i.e. the other section produced by circumferentially bisecting the pipe 20. Specifically, the split portions 22, 23 are made up of multiple long split portions 22 and multiple short split portions 23.

The long split portions 22 are made of metal, and are preferably formed from the same material (aluminum or aluminum alloy, etc.) as the base portion 21. The long split portions 22 have a U-shaped cross-section, more specifically, a semicircular cross-sectional configuration, and are formed to have a substantially longer length in the longitudinal direction than the short split portions 23. In Embodiment 1, the long split portions 22 have the same cross-sectional shape throughout the entire length in the longitudinal direction and are formed by cutting a single long piece of parent material having a U-shaped cross-section.

The circumferential end portions of the long split portions 22 extend to the same height throughout the entire circumference and, as shown in FIG. 4, can be mated with by fitting into the recesses 28 of the mating receiving portions 24. The circumferential end portions of the long split portions 22 are mated with the recesses 28 of the mating receiving portions 24 and these mating locations are subjected to bonding using welding and the like, as a result of which the long split portions 22 and base portion 21 produce a continuous cylindrical configuration in the circumferential direction. At such time, the outer peripheral surface of the long split portions 22 and the outer peripheral surface of the base portion 21 extend in the circumferential direction in a continuous manner practically without any level differences.

Figure 2:
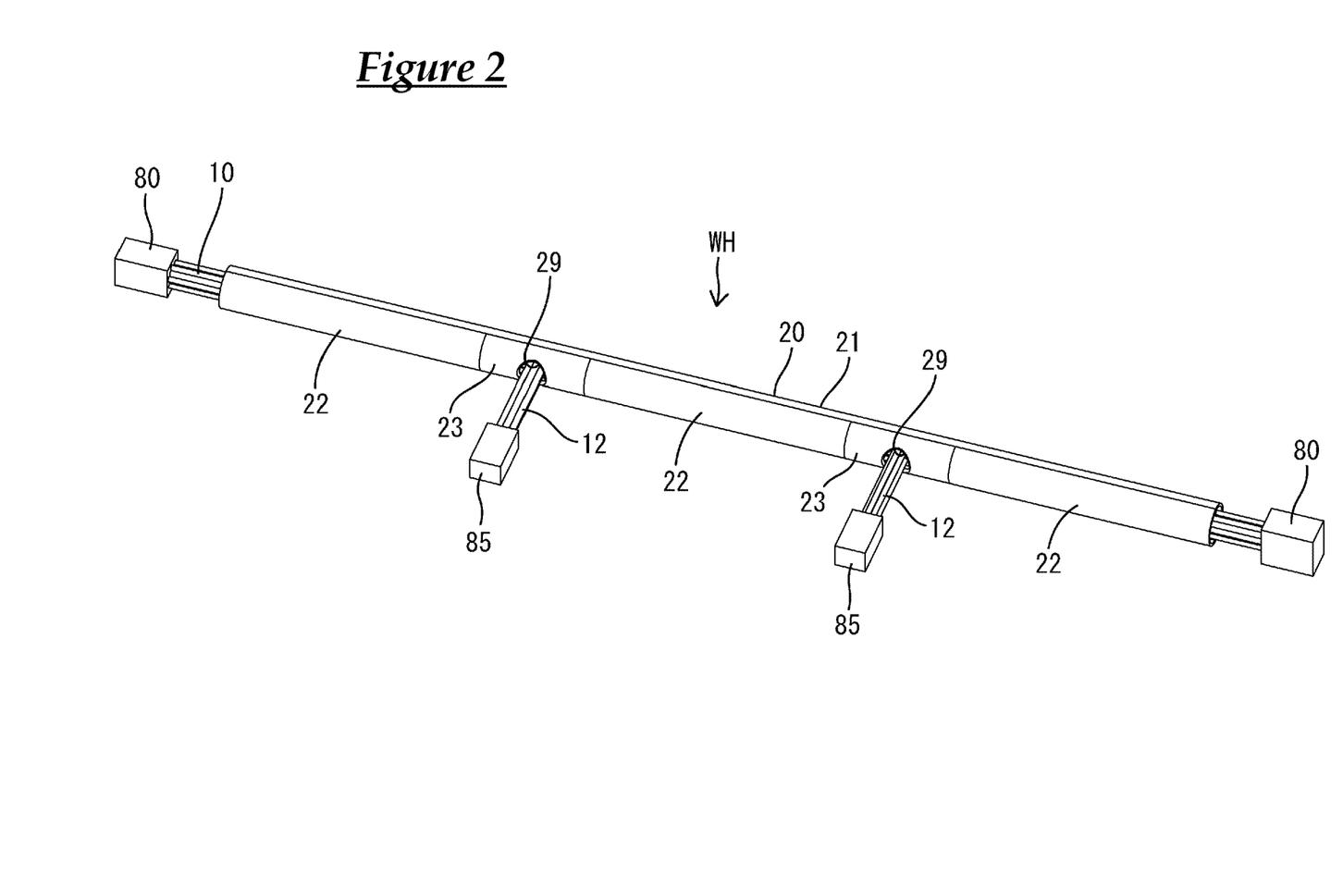
FIG. 2 is an oblique view of a wire harness.
Figure 3:
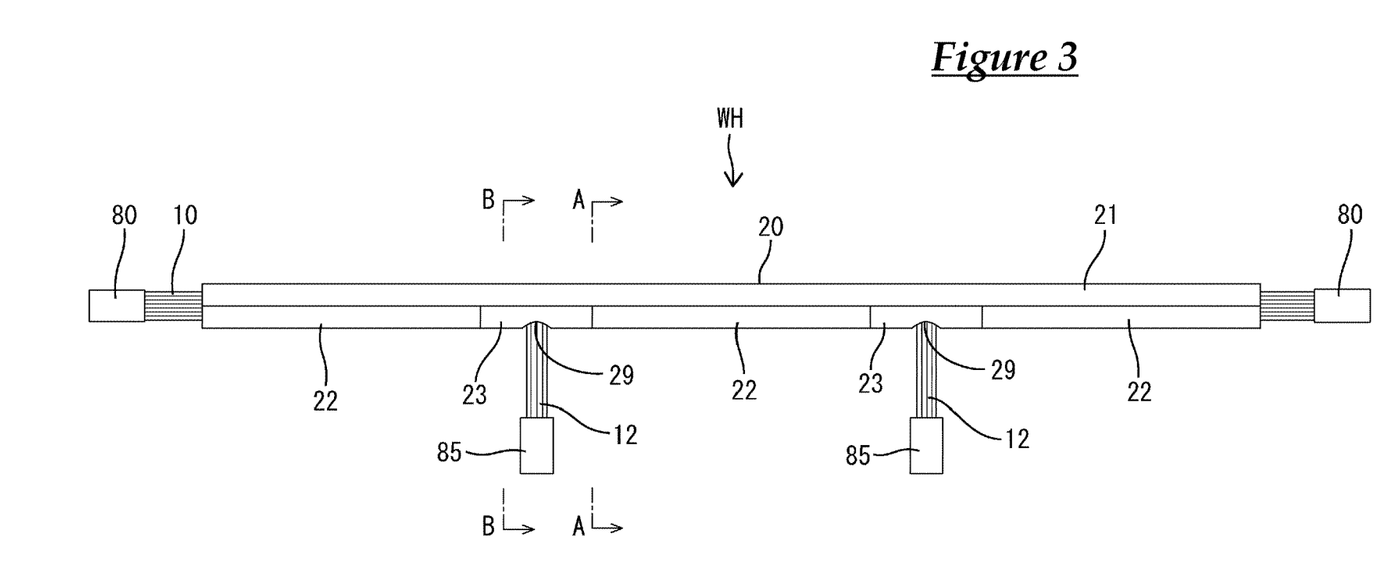
FIG. 3 is a side view of a wire harness.

As shown in FIG. 1 and FIG. 2, the short split portions 23 are installed between two long split portions 22 arranged side-by-side in the longitudinal direction in locations corresponding to the branching sites of the wires 10. The short split portions 23 are made of synthetic resin and have circular extraction outlets 29 provided in the center in the longitudinal direction and in the circumferential direction. The branches 12 of the wires 10 are pulled out of the extraction outlets 29.

Figure 7:
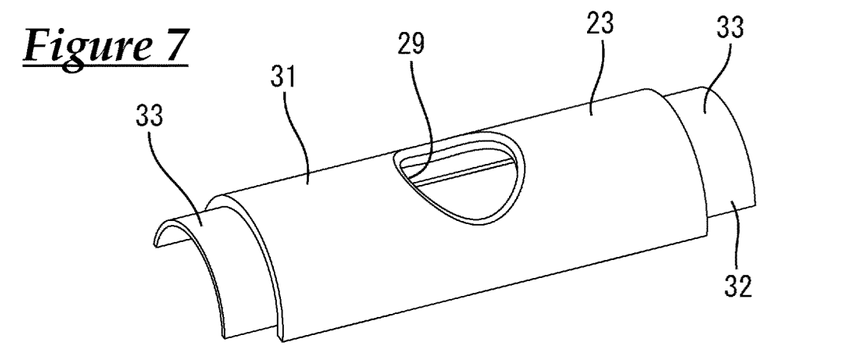
FIG. 7 is an oblique view of a short split portion.
Figure 8:
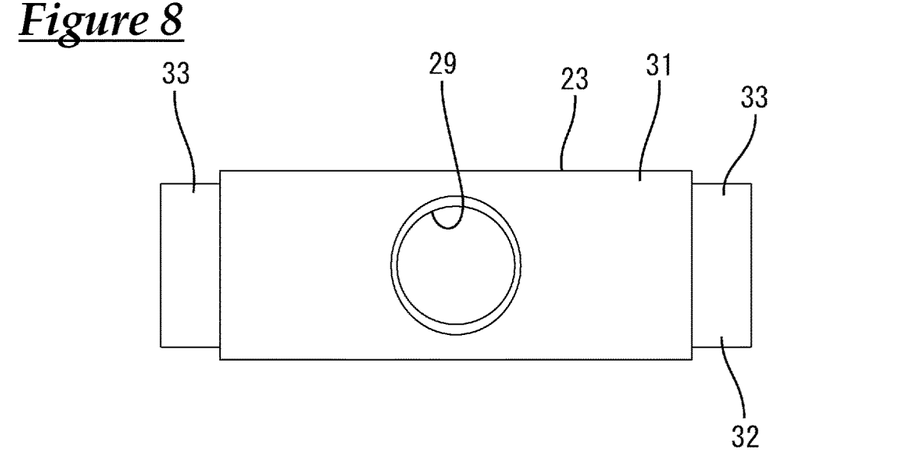
FIG. 8 is a plan view of a short split portion.
Figure 9:
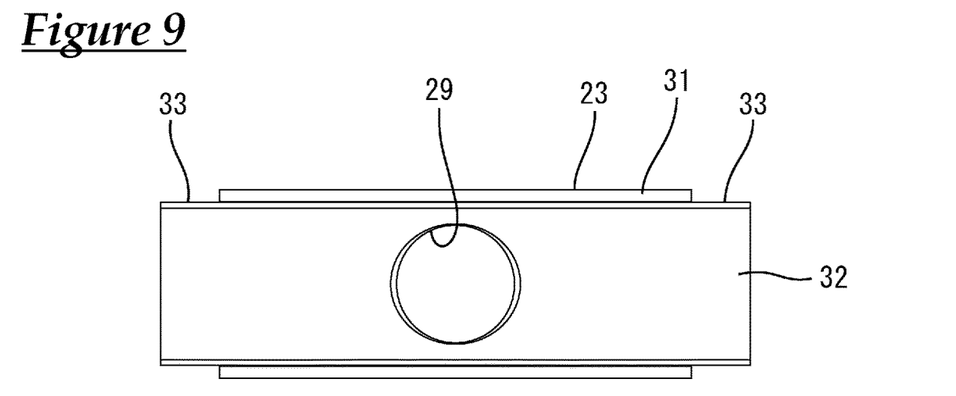
FIG. 9 is a bottom view of a short split portion.

As shown in FIG. 7 through FIG. 9, the short split portions 23 have a configuration, in which an outer peripheral portion 31 and an inner peripheral portion 32 are laminated together in the radial direction. The outer peripheral portion 31 is positioned on the outside in the radial direction and the inner peripheral portion 32 is positioned on the inside in the radial direction.

As shown in FIG. 5, the outer peripheral portion 31 is thicker than the inner peripheral portion 32 in the radial direction. Its thickness is practically the same as the thickness of the long split portions 22 in the radial direction, and it continues from the long split portions 22 without level differences. In addition, the circumferential length of the outer peripheral portion 31 is greater than that of the inner peripheral portion 32. The circumferential end portions of the outer peripheral portion 31 are disposed so as to protrude farther outside in the circumferential direction than the circumferential end portions of the inner peripheral portion 32, with a level difference formed between them and the circumferential end portions of the inner peripheral portion 32.

As shown in FIG. 9, the inner peripheral portion 32 is longer than the outer peripheral portion 31 in the longitudinal direction. As shown in FIG. 7 and FIG. 8, the longitudinal end portions (two end portions) of the inner peripheral portion 32 have lap portions 33 protruding from the longitudinal end portions of the outer peripheral portion 31. When the short split portions 23 are disposed adjacent the long split portions 22, the lap portions 33 are covered by the longitudinal end portions of the long split portions 22, such that the lap portions 33 and the long split portions 22 are made to overlap and are coupled in the radial direction. It should be noted that in Embodiment 1, the short split portions 23 are of mutually identical shape. In addition, the short split portions 23 are of symmetrical shape in the longitudinal direction and in the circumferential direction.

The method of assembly and effects of the wire harness WH of Embodiment 1 are described next.

The wires 10 are routed along the base portion 21 before attaching the split portions 22, 23 to the base portion 21. At such time, the longitudinal end portions of the trunk 11 of the wires 10 protrude from the longitudinal end portions of the base portion 21. At an appropriate moment, connectors 80 are connected to the longitudinal end portions of the trunk 11 of the wires 10.

Subsequently, short split portions 23 are installed on the base portion 21 in locations corresponding to the branching sites of the wires 10. As shown in FIG. 5, in a short split portion 23, the circumferential end portions of the outer peripheral portion 31 are mated with the recesses 28 of the mating receiving portions 24 of the base portion 21, and the circumferential end portions of the inner peripheral portion 32 are disposed to abut the distal end portions of the projection portions 25 of the mating receiving portions 24, thereby defining their position in the radial direction. In this state, the branches 12 of the wires 10 are pulled out of the extraction outlets 29 of the short split portions 23. At an appropriate moment, branch connectors 85 are connected to the longitudinal end portions of the branches 12 of the wires 10. It should be noted that the extraction outlets 29 are formed to have an aperture diameter that allows the branch connectors 85 to be passed therethrough.

Subsequently, as shown in FIGS. 1 and 2, the long split portions 22 are attached to the base portion 21. In this case, the longitudinal end portions of the long split portions 22 are positioned so as to cover the lap portions 33 of the short split portions 23. The circumferential end portions of the long split portions 22 are mated with the recesses 28 of the mating receiving portions 24 of the base portion 21, thereby defining the position of the long split portions 22 in the radial direction with respect to the base portion 21.

Subsequently, the locations of mating between the long split portions 22 and the base portion 21 are subjected to bonding using ultrasonic welding, spot welding, and the like. As a result, along with coupling the long split portions 22 to the base portion 21 in the circumferential direction, the short split portions 23 are held in a state of restricted releasability on the base portion 21 through the medium of the long split portions 22. A cylindrical pipe 20 extending in a linear configuration is formed in this manner. It should be noted that, as shown in FIG. 4, the wires 10 are likely to interfere with the hemispherical surfaces 27 of the projection portions 25 of the mating receiving portions 24. However, since the hemispherical surfaces 27 are formed in a curved shape, there is little danger of damage due to interference with the projection portions 25.

Figure 6:
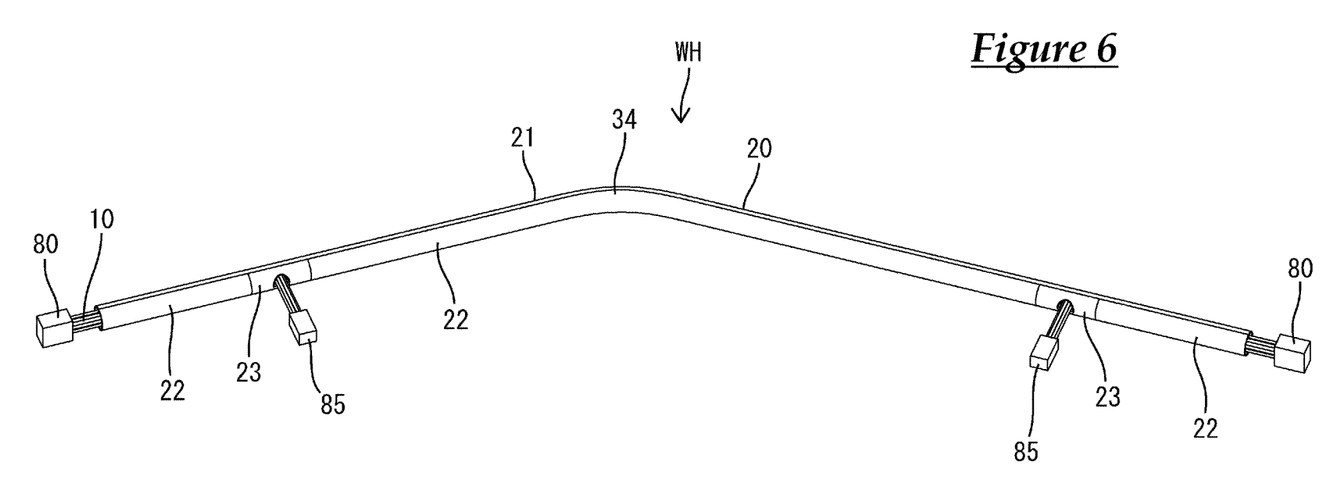
FIG. 6 is an oblique view of a bent wire harness.

Subsequently, the cylindrical pipe 20 formed in a linear configuration as described above is subjected to bending in a bending machine. In this case, the pipe can be bent in accordance with its installation location in a vehicle, not shown, in appropriate locations (one or multiple locations) corresponding to the long split portions 22 in the longitudinal direction of the pipe 20. As a result, curved portions 34, for example, such as the one illustrated in FIG. 6, are formed in the long split portions 22. The wire harness WH is routed in a 2D or 3D configuration through the medium of the curved portions 34.

As described above, in accordance with Embodiment 1, there is provided a tubular pipe 20, through which wires 10 are passed, and the pipe 20 is split into multiple portions in the longitudinal direction and has split portions 22, 23 that can define the locations of branching of the wires 10. This makes it possible to provide a wire harness WH of superior versatility that can be adapted to various routing pathways.

In addition, in the lower half, i.e. one of the sections obtained by circumferentially bisecting the pipe 20, there is a base portion 21 extending in the longitudinal direction, and the multiple split portions 22, 23 are provided in the upper half, i.e. the other section. As a result of coupling the multiple split portions 22, 23 to the base portion 21 in the circumferential direction, the pipe 20 is formed in a tubular shape. Consequently, the split portions 22, 23 can be coupled to the base portion 21 in a state, in which the wires 10 are routed along the base portion 21, thereby providing for excellent routing operation characteristics. In addition, the position of the split portions 22, 23 in the longitudinal direction can be determined with reference to the base portion 21.

Furthermore, since the multiple split portions 22, 23 are made up of multiple types of portions of different length, specifically, two types including the long split portions 22 and the short split portions 23, a variety of routing patterns can be formed by combining these split portions 22, 23.

Further still, since a single short split portion 23 is disposed between two long split portions 22 arranged side-by-side in the longitudinal direction of the pipe 20, locations corresponding to the short split portions 23 can be used as splitting locations in the routing pathway. In this case, extraction outlets 29 are provided in the short split portions 23 and the wires 10 are pulled out of the extraction outlets 29. For this reason, branches 12 can be readily extracted from the trunk 11.

Further still, since the pipe 20 is configured to permit bending in locations corresponding to individual long split portions 22, the pipe 20 can be bent in accordance with various routing patterns and its versatility can be further enhanced.

<Other Embodiments>

Other embodiments are briefly described below.

In the present design, there may be no short split portions present between the long split portions arranged side-by-side in the longitudinal direction and only empty spaces may be left in between, thereby allowing the wires to be extracted from these spaces.

In the present design, either the short split portions or the long split portions may be formed with a circumferential length exceeding half the circumference of the pipe, with the other portions formed with a circumferential length that does not exceed half the circumference.

In the present design, two or more short split portions may be disposed between two long split portions arranged side-by-side in the longitudinal direction of the pipe.

The present design may include a section, in which multiple long split portions are disposed in a continuous manner, without sandwiching short split portions therebetween.

In the present design, the multiple long split portions may include multiple types of different shapes and length dimensions.

In the present design, the multiple short split portions may include multiple types with different shapes and length dimensions. In this case, the short split portions may include portions without structures intended for extracting wires, such as extraction outlets and the like.

In the present design, one or multiple types of split portions with lengths different from the long split portions and short split portions may be additionally included and used as components forming the pipe.

In the present design, the pipe may be formed by coupling multiple cylindrical split portions in the longitudinal direction without providing a base portion.

It is to be understood that the foregoing is a description of one or more preferred exemplary embodiments of the invention. The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. All such other embodiments, changes, and modifications are intended to come within the scope of the appended claims.

As used in this specification and claims, the terms "for example," "e.g.," "for instance," "such as," and "like," and the verbs "comprising," "having," "including," and their other verb forms, when used in conjunction with a listing of one or more components or other items, are each to be construed as open-ended, meaning that the listing is not to be considered as excluding other, additional components or items. Other terms are to be construed using their broadest reasonable meaning unless they are used in a context that requires a different interpretation.

LIST OF REFERENCE NUMERALS

10 Wire
20 Pipe
21 Base portion
22 Long split portion (split portion)
23 Short split portion (split portion)
29 Extraction outlet

What is claimed is:

1. A wire harness, comprising a tubular pipe, through which wires are passed, wherein the pipe is split into a plurality of portions in the longitudinal direction and has a plurality of split portions that can define locations of branching of the wires, and wherein a base portion extending in the longitudinal direction is provided in a section obtained by circumferentially bisecting the pipe, the plurality of split portions are provided in another section, and, as a result of coupling the plurality of split portions to the base portion in the circumferential direction, the pipe assumes a tubular configuration.

2. The wire harness according to claim 1, wherein the plurality of split portions are made up of a plurality of types of different length.

3. A wire harness, comprising a tubular pipe, through which wires are passed, wherein the pipe is split into a plurality of portions in the longitudinal direction and has a plurality of split portions that can define locations of branching of the wires, wherein the plurality of split portions are made up of a plurality of types of different length that include a plurality of long split portions of longer length in the longitudinal direction and at least one short split portion of shorter length in the longitudinal direction, and the at least one short split portion is disposed between two long split portions arranged side-by-side in the longitudinal direction.

4. The wire harness according to claim 3, wherein the at least one short split portion has an extraction outlet that allows the wires to be pulled out.

5. The wire harness according to claim 3, wherein the pipe can be configured to permit bending in locations corresponding to the plurality of long split portions.

* * * * *